United States Patent [19]

Yananton

[11] Patent Number: 4,848,274

[45] Date of Patent: Jul. 18, 1989

[54] ODORLESS ANIMAL LITTER UNIT

[76] Inventor: Patrick Yananton, 1518 Little Hill Rd., Point Pleasant, N.J. 08742

[21] Appl. No.: 10,309

[22] Filed: Feb. 3, 1987

Related U.S. Application Data

[63] Continuation of Ser. No. 573,958, Jun. 11, 1986, Pat. No. 4,640,225, which is a continuation-in-part of Ser. No. 315,307, Oct. 27, 1981, Pat. No. 4,469,046, which is a continuation-in-part of Ser. No. 909,256, May 24, 1978, abandoned.

[51] Int. Cl.$^4$ ............................................. A01K 67/00
[52] U.S. Cl. ......................................................... 119/1
[58] Field of Search ............................................... 119/1

[56] References Cited

U.S. PATENT DOCUMENTS

| | | | |
|---|---|---|---|
| 2,971,493 | 2/1961 | Robb | 119/1 |
| 3,752,121 | 8/1973 | Brazzell | 119/1 |
| 3,965,863 | 6/1976 | Scott | 119/1 |
| 4,469,046 | 9/1984 | Yananton | 119/1 |
| 4,640,225 | 2/1987 | Yananton | 119/1 |

Primary Examiner—Gene Mancene
Assistant Examiner—R. Thomas Price
Attorney, Agent, or Firm—Sheldon H. Parker

[57] ABSTRACT

The odorless animal litter box of the instant invention includes a box-like container capable of locking in place an absorbent pad structure, which includes a protective screening and a moisture impermeable liner. The protective screening is flexible and formed of strands bonded at their interstices, is substantially inert to urine and capable of withstanding the clawing action of an animal such as a cat. The sheet layer of moisture impermeable material has length and width dimensions at least equal to that of the screen. A sorbtive-desiccant pad is positioned between the screen and the moisture impermeable material and the screen is sealed to moisture impermeable material along at least a substantial portion of their peripheral edges.

19 Claims, 3 Drawing Sheets

ODORLESS ANIMAL LITTER UNIT

CROSS REFERENCE TO RELATED APPLICATION

This application is a continuation of the pending patent application Ser. No. 573,958, filed June 11, 1986, now U.S. Patent No. 4,640,225, issued Feb. 3, 1987, which application is a continuation-in-part of application Ser. No. 315,307, filed 10/27/81, now U.S. Pat. No. 4,469,046, which is a continuation-in-part of application Ser. No. 909,256, filed May 24, 1978, now abandoned, the subject matter and description of which is incorporated herein by reference thereto, as though set forth herein in detail.

BACKGROUND OF THE INVENTION

1. Field of the Invention

This invention relates to improvements in a unique odor preventing, disposable, absorbent pad-liner for an animal litter unit, and more particularly to an improved combination of mesh screening and absorbent padding with plastic liner to be utilized in combination with the described custom box or independent holders.

2. Brief Description of the Prior Art

Many domestic animals frequently use litter boxes for the elimination of body wastes. The boxes are usually filled with various kinds of absorbent granular materials such as sand, cat litter and the like, and must be periodically emptied and cleaned, which are somewhat objectionable tasks, since the absorbent granular material must be replaced and the boxes cleaned each time.

Cats, being the most frequent users of litter boxes, present a further problem in that the urine of the feline contains the highest content of urea which, when allowed to stand for any length of time in any absorbent material, releases an ammonia odor. This odor is one of the more objectionable factors in the ownership of a cat.

In order to eliminate the odor caused by cat urine, the litter box must be changed frequently, this being an expensive, laborious and messy job.

Many patents have issued on devices for the indoor use by cats, such as U.S. Pat. No. 3,233,588. The invention disclosed in this patent employs the use of a screen which is placed on top of the cat litter. This patent does ease the problem of animal excrement, by merely lifting the screen and disposing of the feces lying on top, it does not however, contend with the problem of the odor created by the urine. The unit must be periodically emptied of its absorbent granules and thus only partly contends with the elimination of the mess and labor involved. U.S. Pat. No. 3,809,013 is similar, except that a stack of liners is placed under the litter. When the litter becomes soiled, the liner is lifted, the litter filters through screen covered holes in the center of the liner and the litter is reused with the next liner. Again, the excrement is disposed of neatly, however the odor problem remains.

U.S. Pat. No. 3,284,273 discloses an absorbent pad which can be used in combination with animals. Although this pad does contain absorbent capabilities, the odor from the urine of the animal is trapped, much as in the standard cat litter. The pad is not designed for repetitive, long term use in a cat box but rather to retain the urine in a disposable pad, by mopping up pools of urine left on floors or in cages, etc.

U.S. Pat. No. 3,476,083 discloses the use of deodorizing substances which are placed in the bottom of the receptacle. A screen is placed a short distance above, on which lies the standard kitty litter. The upper compartment receives the solid and liquid excreta, retains the solids and absorbs the bulk of the liquid allowing the excess liquids to drain through to the lower compartment. Although providing some neutralizing of the ammonia odor by deodorizing the urine which cannot be absorbed by the litter, it does not provide an effective means for deodorizing the bulk of the urine which has been trapped in the litter. The disposal of all the litter creates a substantial expense to the owner and the cleaning of the lower compartment would be unpleasantly laborious and rather messy. The spilling of the deodorizing substances (lime is suggested) would be objectionable as well as possibly harmful to the person handling the container if by chance some of the chemical substance was to come in contact with the skin.

While many additional patents could be cited regarding other variations of disposal systems, types of granular litter and containers none of these patents overcome both the problem of odor and easy, economical and convenient disposal and replacement.

SUMMARY OF THE INVENTION

In the instant invention the foregoing problems are overcome and an easy to use, odorless, disposable absorbent pad cntaining animal litter box is provided. The odorless animal litter box includes a box-like container capable of locking in place the absorbent pad structure. The absorbent pad structure includes a protective screening and a moisture impermeable liner. The protective screening is capable of withstanding the clawing action of an animal such as a cat, thus protecting the absorbent pad the moisture impermeable liner. The sheet layer of moisture impermeable material has length and width dimensions at least equal to that of the screen. The sorbent pad is positioned between the screen and the moisture impermeable material. The screen is sealed to moisture impermeable material along at least a substantial part of their peripheral edges. The screen is a flexible member formed of strands bonded at their interstices and is formed of a material which is substantially inert to urine. The strands have a tensile strength of at least 20 in lbs./sq.in. in both the warp and filling direction and a thread size in the range from 30 to 80 denier. The screen has mesh count, in number of squares per per square inch, in the range of between 850 and 175.

BRIEF DESCRIPTION OF THE DRAWINGS

The advantages and objects of the invention will become apparent and the invention will be more fully understood from the following specification, particularly when read in conjunction with the drawings, wherein.

DETAILED DESCRIPTION OF THE INVENTION

Figure 1:
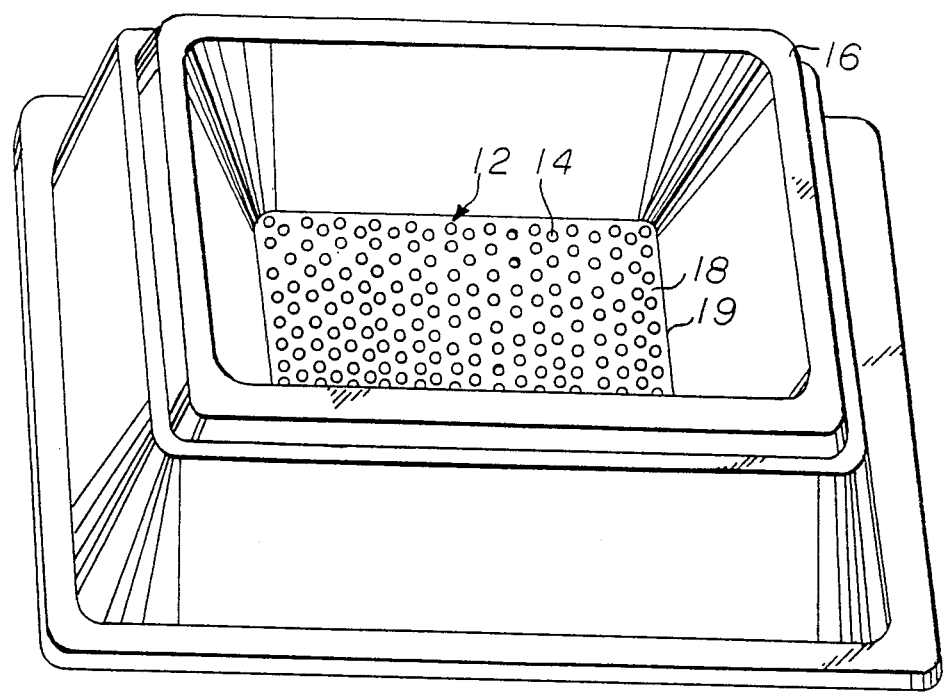
FIG. 1 is a top perspective of the assembled unit in accordance with the present invention.

In order to provide a clear understanding of the instant invention, the various aspects of the invention are hereinafter described in detail.

GRANULAR MATERIAL 20

The granular material as employed in the instant invention is utilized to satisfy the digging instinct of the animal and therefore need not provide absorptive qualities. Consequently, inexpensive materials, such as clay, can be used in accordance with individual preferences. Unlike the commonly employed systems in which the granular material must be used in quantity to provide the required absorptive qualities and digging qualities, minimal quantities of the granular material can be used, as illustrated in the charts supra. The absorption quality of the layer 24 can provide the total or the predominant desiccation effect.

It is critical that the granular material be in contact with the underlying absorbent material so that the urine can be drawn into the absorptive layers. The particle size distribution of the granular material is such that it contains particles which are small enough to fit through the openings of the screen and provide direct moisture transfer from the granular particles to the lower absorptive layer.

The particle size distribution can range between 5.6 to 1 mm, corresponding to U.S. Series Standard Sieve opening #3 1/2 to #18. Smaller particles exist within the litter down to the size of dust, but do not adversely effect the primary function of the particles or adversely effect the absorptive material. Transport of the liquid across the screen can actually be enhanced by the presence of the small particles which are aesthetically undesirable but functionally acceptable.

ABSORBENT UNIT 12

The sorbtive-desiccant elements can be paper, tissue, pulp, starch, and related polymers, etc. Any material which can disperse the liquid quickly, thus providing a large surface area for evaporation of moisture can be used. It is necessary to evaporate from 5 to 20 ml. of liquid each time the litter is used by the cat.

Examples of materials which absorb liquid and cause a drying of the litter, (hence sorbtive-desiccant materials), are those manufactured by Dow Chemical and marketed under U.S. Pat. No. 4,117,184. The instant patent application incorporates by reference thereto, as though set forth in detail herein the description in U.S. Pat. No. 4,117,184 of a product commonly identified as a super absorbent and sold by Dow Chemical Company under the designation DWAL 35 R. The Dow Chemical product is available as a laminate which includes at least a tissue layer and a polymer film layer. The Dow Chemical laminate has an indicated minimum liquid absorbency capacity of 38 grams per gram of laminate.

Alternatively, the super absorbent can be a material such as the National Starch and Chemical Corporation product sold under the registered trademark PERMASORB. The National Starch product is a hydrophilic polymer which has the ability to absorb and hold urine. There is a significant reduction in urine odor and pH level in the presence of PERMASORB.

A ground paper pulp sorbtive-desiccant material has been found to provide a combination of high absorbency, high surface area and low cost. The large surface area provides for rapid urine evaporation.

Toxic chemicals are not only unnecessary but preferably are to be avoided.

Bacteria from the feces cannot grow in the sorbtive-desiccant layer because they are dried out and die or become dormant. It is bacteria which is capable of breaking down the urea into ammonia causing the strong volatile odor commonly associated with cat litter boxes.

As previously stated, the instant invention requires substantially less granular material for each use and requires fewer changes, saving further on granular use. In the prior art type of litter box, the litter consumption is greater than in accordance with the present invention.

SCREEN MATERIALS 19

A flexible, screen like mesh or permeable or semipermeable membrane is utilized to prevent the animal from clawing through to the absorbent layer. The screen material must, therefore, exhibit sufficient strength to with stand the clawing action of the animal. Some of the preferred materials of construction include nylon, polyester, polypropylene, vinyl coated fiberglas. The mesh-like screen or netting 19 can be formed by weaving, knitting, pressure adhesive, heat sealing or any process capable of providing the required claw rip resistance.

Even though the screen is disposable, it is critical that the screen be made of a material which is relatively inert to urine thereby preventing rapid corrosion of the screen material, resultant odors and chemical activity.

From the stand point of rip resistance, the required tensile strength in lbs./sq.in., must be at least 20 and can be as high as 150 or more in both the warp (length) and filling direction. From the stand point of the manufacture of the screen-absorptive layer combination, a minimum warp strength of 20 is also required. The preferred minimum strength is at least 50. The thread size preferably ranges from 30 to 80 denier.

The mesh count, in number of squares per square inch, can range between 850 and 175. At the upper limit, the hole size is so small as to interfere with liquid transfer. At the lower limit, the hole size is so large that the protective ability becomes inadequate. The lower plastic layer must be protected from the cats claws since even pin holes can cause urine to seep under the liner and causing a severe odor problem. Similarly the absorptive layer must be protected from the tearing action of the claws. For example, the screen of Vander Wall, U.S. Pat. No. 3,476,083, would be totally inoperative to prevent tearing of the absorptive layer or the plastic moisture barrier.

The use of a loose screen-like fabric is unacceptable because the mesh can be varied as a result of the force of the animal's claws. Accordingly, the reference to mesh size is intended to indicate the effective size under the acutal use conditions rather than a temporary size which can be readily altered by the animal.

Structural integrity of the screen can be achieved by any of the known means which yields bonding of the strands at their interstices, As for example, through fusion of strands at the cross-over points or through the weaving or knitting of the strands or any other means which precludes relative movement of the strands.

FIG. 1 illustrates, through a top perspective view, the assembled unit 10 of the instant invention. The outer shell unit 16 is slipped over the inner shell unit 44, shown in FIG. 4, locking the absorbent unit 12 in place.

The granular material 20, which can be absorbent or non-absorbent, is placed on top of the absorbent unit 12 to provide the animal with the necessary scratching materials, if so required. The granular material would not be required if the unit was being used for a dog or other animal which did not have the scratching instinct.

In the modification of FIG. 1, the screen 19 is formed as an integral part of the outer shell unit 16. A large number of holes 14 are provided in order to permit the free passage of urine from the region above the screen to the sorbtive-desiccant layer below.

Figure 2:
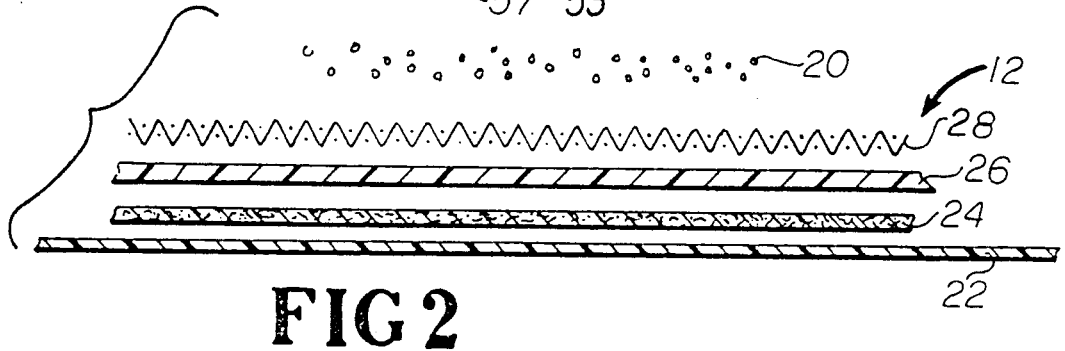
FIG. 2 is an exploded fragmentary view of the absorbent pad of the instant invention.
Figure 7:
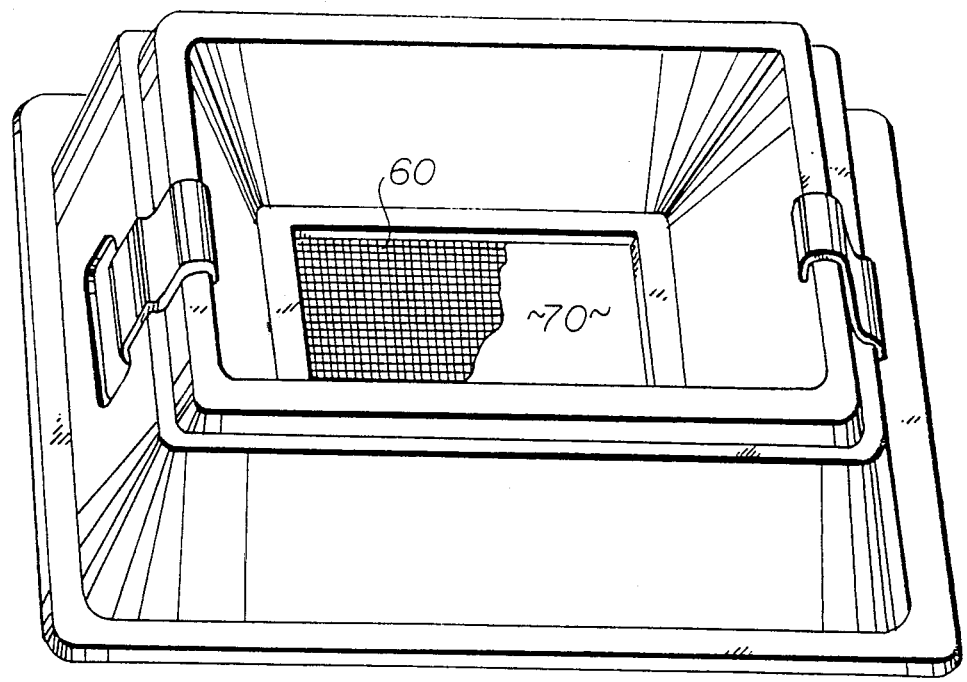
FIG. 7 is a fragmentary top perspective view of an embodiment of the instant invention which employs a locking mechanism.

FIG. 2 shows, in exploded form, a cross-section of the layers which form the absorbent unit 12. The outer layer 22 which is a thin plastic sheet of a material such as polypropylene or polyethylene prevents waste from making contact with the box and doubles as a bag when disposing of the soiled litter. The sorbtive-desiccant layer 24 is formed from a super absorbent, rapidly evaporating material as previous stated herein.

The protective layer 26 is made from a durable, non-woven tissue substance. In addition to the protective layer 26, there can be an additional layer of either a hydrophobic or hydrophilic material. If a binder is used for either the fabric of the tissue layer or other layer, it must be of a non-water soluble material. The protective screen 28 is of a flexible, durable substance which prevents the animal from scratching through to the bottom layers. The protective layer 26 is described in greater detail in association with FIG. 6. The granular material 20 is placed on top of the absorbent unit as previously described herein.

Figure 3:
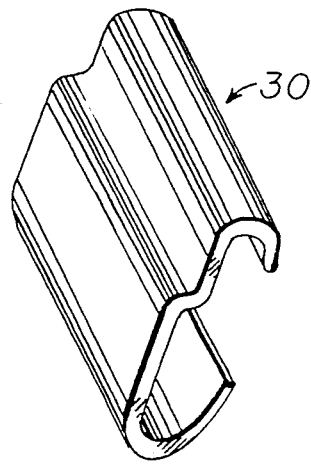
FIG. 3 is a perspective view of a locking handle for use with the embodiment of the invention shown in FIG. 7.
Figure 5:
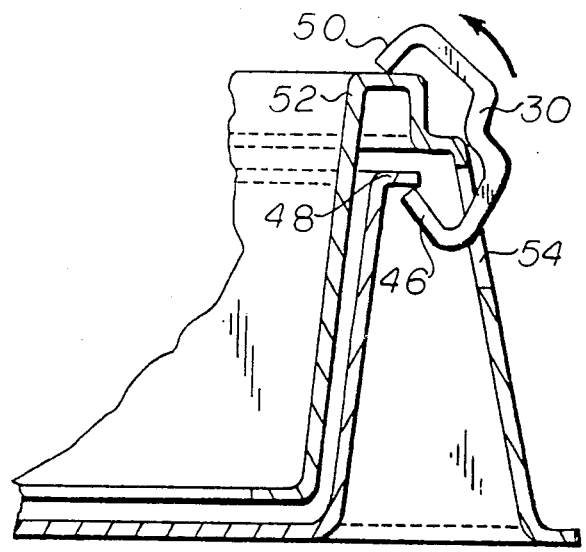
FIG. 5 is a perspective view of an assembled unit with the handle in the initial position prior to being locked.
Figure 4:
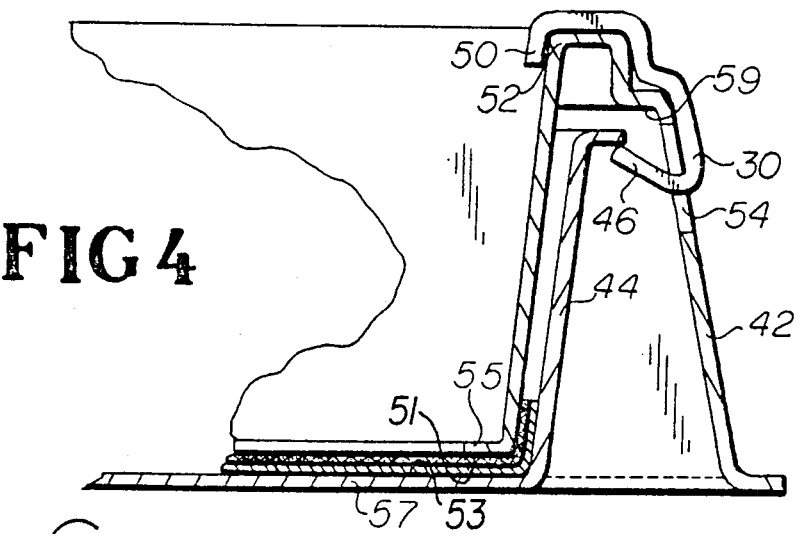
FIG. 4 is a perspective view of an assembled unit with the handle in the locked position.

FIG. 3 illustrates the locking handle 30, the contour of which should conform to that of the outer shell unit 42, as seen in FIG. 4. The outer shell unit 42 has been placed over the inner shell unit 44, locking the absorbent unit 12 in place. The locking handle 30 bottom edge 46 is inserted through the cut out section 54 and placed under the inner shell unit 44 lip 48. The top edge 50 of the locking handle 30 is then slipped over the outer surface 52 of the outer shell unit unit 42, as illustrated in FIG. 5. This action forces the inner shell unit 44 and the outer shell unit 42 to be locked together, preventing slippage of the absorbent unit 12 and providing convenient handles with which to transport the unit. The essential factor in the locking together of the two sections, is the compression of the sorbent unit 12 between the bottom surface 51 of the inner bottom region 55 of the outer shell 42 and the upper surface 53 of the base 57 of the inner shell unit 44. It should be evident that the top lip 48 of the inner shell 44 must be sufficiently spaced from the lower surface 59 of the upper section of the outer shell 42 so as to permit the locking handle 30 to exhibit its compressive force and lock the sorbent unit 12 in place before the top lip 48 can come into contact with the outer shell 42. Also seen in FIG. 5 is the importance of the matching contours of the locking handle 30 and the outer shell unit 42.

Figure 6:
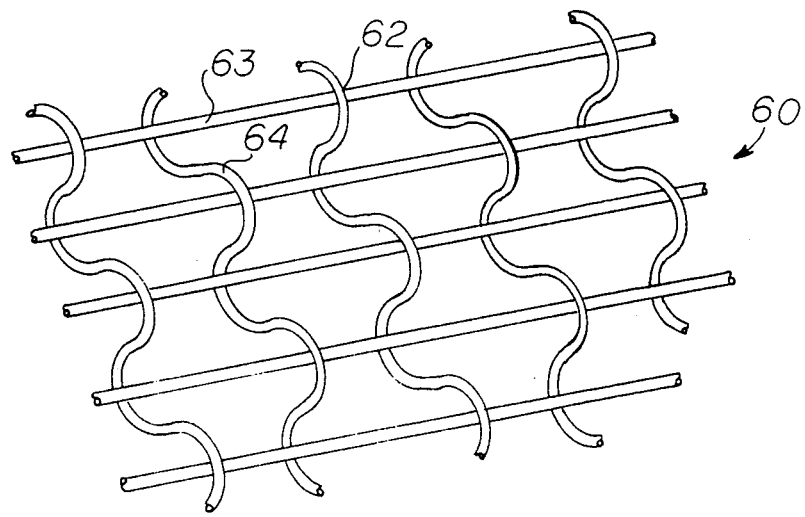
FIG. 6 is an enlarged fragmentary view of a screen for use with the instant invention.

FIG. 6 is an enlarged view of the rip proof screen 60. The screen is formed of strands 63 and 64 which are at right angles to each other as well known in the art. The instinct of cats to scratch at fabrics puts a heavy stress on the screen. The clawing action can separate the strands to the point that the sorbtive-desiccant material 70 which underlies the screen can becomee exposed to the claws and torn apart. It is essential that the urine is free to pass through the screen and any intermediate layers, such as a hydrophobic membrane and one or more layers of tissue paper to the sorbtive-desiccant material. Therefore, neither the screen nor the intermediate layers can offer restriction to the urine flow except as well known for the hydrophobic membrane. For this reason, the screen must have sufficient porosity and or hydrophilicity such that beading of urine does not occur. The interstices of the cross strands are shown in FIG. 6, to be fused, as for example by means of heat. It has been found that this type of structure can withstand intense clawing without separation of strands. Thus the inner layers are protected from the claws of the cat. In this regard it is noted that the openings 14 of the screen 19 of FIG. 1, must represent a very high percent of the solid area 18 of the screen as compared to the area occupied by the solid area of the screen. The desired ratio has been found to be more reliably attainable with screens having strands fused at their interstices than by any other means. It must be understood that the opening cannot be so large that the cat can claw at the underlying layers. It is this later fact which results in the difficulty in attaining the required porosity.

What is claimed is:
1. A sorbent pad laminate means and litter, for the collection of animal urine, to be used in combination with a self-supporting cat litter container, said sorbent pad laminate means comprising;
   A a bottom sheet layer of moisture impermeable material,
   B an intermediate sorptive-desiccant layer of material having a high sorption capacity for urine and high surface area,
   C a top claw resistance screen means, protecting said intermediate sorbent layer, whereby said litter granules overlie said top claw resistant screen means.
2. The sorbent pad laminate means of claim 1 wherein said claw resistant screen means is a urine permeable, flexible member of material which is substantially inert to urine, having a tensile strength of at least 20 pounds per square inch in both the warp and filling directions.
3. The sorbent pad laminate of claim 2 wherein said claw resistant screen means has sufficiently small hole size, said hole size ranging between 850 and 175 squares per square inch, to protect said sorbent layer and said sheet layer of moisture impermeable material from being torn by animal claws.
4. The combination of claim 1 wherein said litter granules are substantially non-urine absorbent.
5. The combination of claim 1 wherein said self-supporting container has a base and four walls.
6. The combination of claim 5 wherein said sorbent pad laminate means is in contact with said base and walls of said self-supporting container.
7. The combination of claim 1 wherein said self-supporting container is formed from a disposable material.
8. The combination of claim 7 wherein said disposable material is coated with an urine impermeable substance.
9. The combination of claim 7 wherein said disposable material is made from an urine impermeable substance.
10. An animal urine sorbent pad laminate means for use in preventing the odor caused by the action of bacteria on urine in a litter container, wherein the litter container is a self supporting structure having a base and walls, said laminate means comprising, in combination;
   (A) bottom moisture impermeable means,

(B) intermediate sorbtive-desiccant member formed of material having a high sorption capacity for urine and a high wicking surface area, and (C) top claw resistant screen means for protecting said sorbtive-desiccant member from the clawing action of a cat, (D) litter granules, overlying said top claw resistant screen means.

11. The top claw resistant screen means of claim 10 wherein said screen means a urine permeable means formed of material which is substantially inert to urine and of sufficient tear strength and sufficiently small hole size to protect said sorbtive-desiccant member and said moisture impermeable member from the clawing action of a cat, positioned such that it is in urine transfer contact with said sorbent means.

12. The top claw resistant screen means of claim 10 wherein said screen means has sufficient cat urine transfer capability thereby allowing the urine to pass directly through the screen means thereby permitting the transferring of the cat urine directly from said litter granules, through the said screen means into the sorbtive-desiccant member by the sorptive action of the sorbtive-desiccant member and permitting the evaporation of the liquid of said urine from said high surface area sorbtive-desiccant member through said screen means, whereby the bacteria, which are capable of breaking down urea die or become dormant and significant odor formation is prevented.

13. The combination of claim 10 wherein said sorbent pad laminate means overlays said base of said self-supporting litter container.

14. The combination of claim 13 wherein said sorbent pad laminate means overlays said walls of said self-supporting litter container.

15. The combination of claim 10 wherein said litter granules are substantially non-urine absorbent.

16. The method of preventing the formation of the odor associated with cat litter boxes by preventing bacteria from breaking down urea in cat urine into ammonia, comprising the steps of (a) providing cat urine transfer directly from overlying nonabsorbent litter particles, through a cat claw resistant screen means into a sorbtive-desiccant member by (b) sorbing said urine in a sorbtive-desiccant member having high surface area, high urine sorbency, and dispersing the urine quickly in said sorbtive-desiccant member, (c) preventing urine from leaving the side of sasid sorbtivedesiccant member opposite said screen means by having said side opposite said screen means in contact with a moisture impermeable means, (d) evaporating the liquid of said urine from said high surface area sorbtivedesiccant member through said screen means and thereby causing the bacteria, which are capable of breaking down cat urine, to die or become dormant thereby preventing significant odor formation.

17. The method of claim 16 wherein said screen means and said moisture impermeable means are relatively immovable with respect to each other.

18. The method of claim 16 wherein said screen means is of sufficient tear strength and sufficiently small hole size to protect said sorbtive-desiccant member and said moisture impermeable member from the clawing action of a cat.

19. The method of claim 17 wherein said screen has sufficient hydrophilicity such that urine pass through said screen means and without bead formation on the surface of the said screen.

* * * * *